United States Patent
Oh et al.

(10) Patent No.: US 9,641,213 B2
(45) Date of Patent: May 2, 2017

(54) MODE SWITCHING AVAILABLE WIRELESS TRANSCEIVER

(71) Applicant: Electronics and Telecommunications Research Institute, Daejeon (KR)

(72) Inventors: Jung Hoon Oh, Daejeon (KR); Heon Kook Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 146 days.

(21) Appl. No.: 14/614,728

(22) Filed: Feb. 5, 2015

(65) Prior Publication Data

US 2015/0229463 A1    Aug. 13, 2015

(30) Foreign Application Priority Data

Feb. 12, 2014    (KR) ........................ 10-2014-0016225

(51) Int. Cl.
*H04B 7/005*    (2006.01)
*H04B 1/48*    (2006.01)
*H04B 1/00*    (2006.01)
*H04L 5/14*    (2006.01)

(52) U.S. Cl.
CPC ............. *H04B 1/48* (2013.01); *H04B 1/0057* (2013.01); *H04L 5/143* (2013.01); *H04L 5/1469* (2013.01)

(58) Field of Classification Search
CPC .................................. H04B 1/00; H04Q 1/50

USPC ................ 370/278, 294–295, 277, 280
See application file for complete search history.

(56) References Cited

U.S. PATENT DOCUMENTS

| | | | | | |
|---|---|---|---|---|---|
| 4,621,355 | A | * | 11/1986 | Hirosaki | H04L 27/2647 370/203 |
| 7,349,665 | B1 | * | 3/2008 | Zhu | H04B 7/15542 455/11.1 |
| 8,923,169 | B2 | * | 12/2014 | Poulin | 370/280 |
| 2008/0318527 | A1 | * | 12/2008 | Higuchi | H04B 1/707 455/42 |

(Continued)

*Primary Examiner* — Edan Orgad
*Assistant Examiner* — Christopher Lewis
(74) *Attorney, Agent, or Firm* — NSIP Law

(57) ABSTRACT

Provided is a transceiver. The transceiver includes: a transmission unit modulating at least one of a plurality of baseband transmit signals to an RF band and amplifying the modulated at least one; a duplexer transmitting transmit signals outputted from the transmission unit to an antenna by selecting a signal in a downlink frequency band or an uplink frequency band or filtering a receive signal received from the antenna by the downlink frequency band or the uplink frequency band; a reception unit demodulating the receive signals in the downlink frequency band or the uplink frequency band from the duplexer into at least one baseband signal; a first switch delivering a transmit signal provided from the transmission unit to a first RF band filter of the duplexer in a first communication mode and a second communication mode; and a second switch delivering a first receive signal delivered from a second RF band filter of the duplexer to the reception unit in the first communication mode and a third communication mode, wherein each of the transmission unit and the reception unit includes one power amplifier and one low noise amplifier.

15 Claims, 6 Drawing Sheets

(56) References Cited

U.S. PATENT DOCUMENTS

| | | | |
|---|---|---|---|
| 2010/0118744 A1* | 5/2010 | Kwon | H04B 1/406 370/278 |
| 2012/0231751 A1* | 9/2012 | Oka | H04B 1/0053 455/78 |
| 2012/0237151 A1* | 9/2012 | Felis | H04B 1/44 455/78 |
| 2012/0249888 A1* | 10/2012 | Naik | H04B 1/0007 348/726 |
| 2013/0155939 A1 | 6/2013 | Lee et al. | |
| 2013/0230026 A1* | 9/2013 | Kwon | H04W 76/023 370/336 |
| 2014/0016525 A1* | 1/2014 | Yoshizawa | H04B 1/006 370/294 |
| 2014/0301318 A1* | 10/2014 | Luo | H04L 5/0007 370/329 |
| 2016/0150592 A1* | 5/2016 | Samuel | H04W 76/023 370/315 |

\* cited by examiner

FIG. 3

| SW<br>MODE | | $SW_{T1}$ | $SW_{R1}$ | $SW_{T2}$ | $SW_{R2}$ | $SW_{T3}$ | $SW_{R3}$ |
|---|---|---|---|---|---|---|---|
| FDD | | OPEN | OPEN | A | A | A | A |
| TDD | DL | SHUNT | OPEN | B | B | A | B |
| | UL | OPEN | SHUNT | B | B | B | A |

MODE SWITCHING AVAILABLE WIRELESS TRANSCEIVER

CROSS-REFERENCE TO RELATED APPLICATIONS

This U.S. non-provisional patent application claims priority under 35 U.S.C. §119 of Korean Patent Application No. 10-2014-0016225, filed on Feb. 12, 2014, the entire contents of which are hereby incorporated by reference.

BACKGROUND OF THE INVENTION

The present invention disclosed herein relates to a wireless transceiver supporting a frequency division multiplexing mode and a time division multiplexing mode.

A Long-Term Evolution (LTE) system combines Orthogonal Frequency Divisional Multiplexing (OFDM) and Multi-Input Multi-Output (MIMO) techniques in order to implement wireless communication for high speed and large amount of data transmission. An early LTE system is commercialized based on frequency divisional duplex (FDD). Such a system is referred to as an LTE-FDD system. The LTE-FDD system allocates different frequency bands to a downlink (DL) and an uplink (UL), respectively, so that data of a base station and a terminal is transmitted/received. The DL is a channel where data is transmitted from a base station to a terminal and the UL is a channel where data is transmitted from a terminal to a base station. However, in relation to FDD, when the amount of data transmitted to one of the UL and the DL is relatively less, this directly relates to frequency resource waste.

In order to compensate this, an LTE-FDD system combined with TDD is introduced. The LTE-TDD system divides a time in one frequency band and performs data transmission between a base station and a terminal. The LTE-TDD system may manage data transmission efficiently by dividing the UL and the DL into a plurality of time slots and varying a distribution ratio of the time slots.

As a result, in the LTE-FDD system, the DL and the UL may be allocated with different frequency bands and thus continuous data transmission may be possible between a base station and a terminal. However, in the LTE-TDD system, both DL and UL frequency bands are used at a specific time slot and UL transmission and DL transmission operations are performed through LTE-TDD. The number of time slots allocated at this point may vary depending on the amount of data and efficient frequency usage may be possible.

Accordingly, wireless service providers are increasingly adopting the LTE TDD system. However, in the case of a terminal equipped with a transceiver for typical LTE-FDD system, it is difficult for the terminal to be compatible with the LTE-TDD system. Accordingly, reasonably priced transceivers for easy mode switching between LTE-TDD and LTE-FDD are in demand.

SUMMARY OF THE INVENTION

The present invention provides a transceiver supporting both LTE-FDD and LTE-TDD.

Embodiments of the present invention provide transceivers including: a transmission unit modulating at least one of a plurality of baseband transmit signals to an RF band and amplifying the modulated at least one; a duplexer transmitting transmit signals outputted from the transmission unit to an antenna by selecting a signal in a downlink frequency band or an uplink frequency band or filtering a receive signal received from the antenna by the downlink frequency band or the uplink frequency band; a reception unit demodulating the receive signals in the downlink frequency band or the uplink frequency band from the duplexer into at least one baseband signal; a first switch delivering a transmit signal provided from the transmission unit to a first RF band filter of the duplexer in a first communication mode and a second communication mode; and a second switch delivering a first receive signal delivered from a second RF band filter of the duplexer to the reception unit in the first communication mode and a third communication mode, wherein each of the transmission unit and the reception unit includes one power amplifier and one low noise amplifier.

In some embodiments, in the second communication mode, the second switch may deliver a transmit signal from the transmission unit to the second RF band filter of the duplexer.

In other embodiments, in the third communication mode, the first switch may deliver a second receive signal provided from the first RF band filter of the duplexer to the reception unit.

In still other embodiments, the transmission unit may include a transmission switch terminal selecting at least one of a plurality of RF band transmit signals according to a communication mode and providing the selected at least one to the power amplifier.

In even other embodiments, the transmission switch terminal may include: a mixing switch mixing the plurality of RF band transmit signals according to the communication mode; and a selection switch selecting one of the plurality of RF band transmit signals or the mixed transmit signal according to the communication mode.

In yet other embodiments, each of the plurality of RF band transmit signals may include signals modulated to the uplink or downlink frequency band.

In further embodiments, the reception unit may include: the low noise amplifier amplifying RF band receive signals provided from the first switch or the second switch; a reception switch terminal selecting at least one of the RF band receive signals according to a communication mode; and a plurality of baseband filters demodulating the receive signals into a baseband.

In still further embodiments, the reception switch terminal may include: a selection switch delivering the RF band receive signals to one of the plurality of baseband filters or delivering the RF receive signals to the plurality of baseband filters simultaneously, according to the communication mode; and a distribution switch distributing receive signals in an RF band provided from the selection switch into the plurality of baseband filters simultaneously according to the communication mode.

In even further embodiments, the reception unit may include mixers demodulating the RF band receive signals into a baseband.

In yet further embodiments, the first communication mode may correspond to a frequency division duplex (FDD) mode; the second communication mode may correspond to a time division duplex (TDD) transmission mode; and the third communication mode may correspond to a TDD reception mode.

In other embodiments of the present invention, transceivers include: a transmission switch terminal selecting one or all of a first transmit signal of a downlink frequency and a second transmit signal of an uplink frequency; a power amplifier amplifying a transmit signal delivered from the transmission switch terminal; a duplexer separating the amplified transmit signal into a downlink or uplink frequency band and transmitting the separated signal to an antenna or filtering a receive signal received from the antenna by the downlink or uplink frequency band; a low noise amplifier amplifying receive signals in the downlink or uplink frequency band from the duplexer; a reception switch terminal distributing a receive signal outputted from the low noise amplifier into first and second demodulation units demodulating signals into the downlink or uplink frequency band; a first switch delivering a transmit signal of the power amplifier to a first RF band filter of the duplexer in a frequency division mode and a time division transmission mode; and a second switch delivering a first receive signal delivered from a second RF band filter of the duplexer to the low noise amplifier in the frequency division mode and a time division reception mode.

In some embodiments, the second switch may deliver a transmit signal from the power amplifier to a second RF band filter of the duplexer in the time division transmission mode.

In other embodiments, the first switch may deliver a second receive signal provided from the first RF band filter of the duplexer to the low noise amplifier in the time division reception mode.

In still other embodiments, the transmission switch terminal may include: a selection switch delivering the first transmit signal to the power amplifier in the frequency division mode; and a mixing switch mixing the first transmit signal and the second transmit signal and delivering the mixed signal to the selection switch in the time division transmission mode, wherein the selection switch may deliver a signal delivered from the mixing switch to the power amplifier in the time division transmission mode.

In even other embodiments, the reception switch terminal may include: a selection switch delivering an output of a low noise amplifier to the first demodulation unit demodulating signals into the uplink frequency band in the frequency division mode; and a distribution switch distributing the output of the low noise amplifier into the first demodulation unit and the second demodulation unit demodulating signals by the uplink and downlink frequency bands, respectively in the time division reception mode.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 3 is a table illustrating states of switches for each mode in the transceiver of FIG. 2;

DETAILED DESCRIPTION OF PREFERRED EMBODIMENTS

Figure 1A:
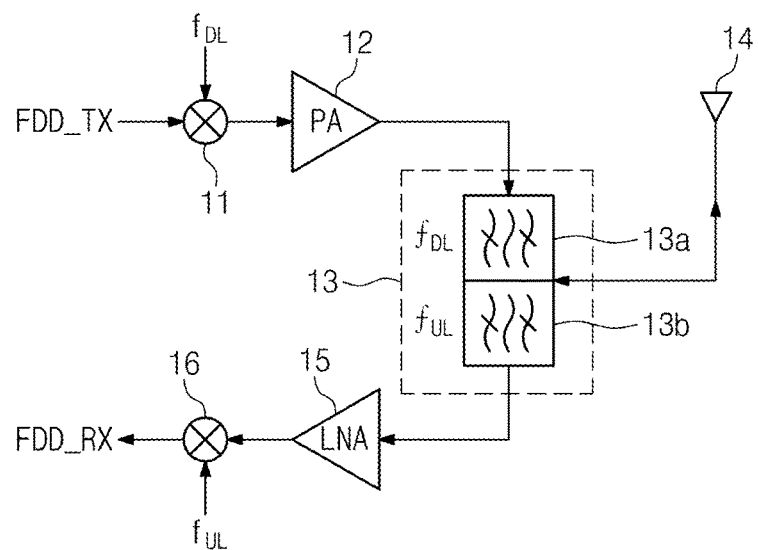
FIGS. 1A and 1B are block diagrams illustrating FDD and TDD transceivers, respectively.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Terms used herein are merely provided for illustration of specific embodiments, and not limited to the present invention. A singular form, otherwise indicated, include a plural form. Herein, the term "comprise" or "have" intends to mean that there may be specified features, numerals, steps, operations, elements, parts, or combinations thereof, not excluding the possibility of the presence or addition of the specified features, numerals, steps, operations, elements, parts, or combinations thereof.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or excessively formal meaning.

The term 'terminal device' or 'terminal' used in this specification may be referred to as a user equipment (UE), a mobile station (MS), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or another term. Various embodiments of a terminal may include a cellular phone, a smartphone with wireless communication function, a personal digital assistant with wireless communication function, a wireless modem, a portable computer with wireless communication function, a capturing device such as a digital camera with wireless communication function, a gaming device with wireless communication function, a music storing and playing home appliance with wireless communication function, an internet home appliance capable of wireless internet access and browsing, and portable units or terminal integrating combinations of such functions, but the present invention is not limited thereto.

The term 'cell' or 'base station' used in this specification may generally refer to a fixed or mobile point communicating a terminal and may be a collective term for a base station, a Node-B, an eNode-B, a base transceiver system (BTS), an access point, a transmit point, a receive point, a remote radio head (RRH), remote radio unit (RRU), a relay, and a Femto-Cell. Furthermore, a transceiver described in the present invention may be a device applied to both a terminal and a base station. For convenience of description, advantages of the present invention are described by using a transceiver in a base station as an example.

The meaning of "include," "comprise," "including," or "comprising," specifies a property, a region, a fixed number, a step, a process, an element and/or a component but does not exclude other properties, regions, fixed numbers, steps, processes, elements and/or components. An embodiment described and exemplified herein includes a complementary embodiment thereof.

Hereinafter, it will be described about an exemplary embodiment of the present invention in conjunction with the accompanying drawings.

Figure 1B:
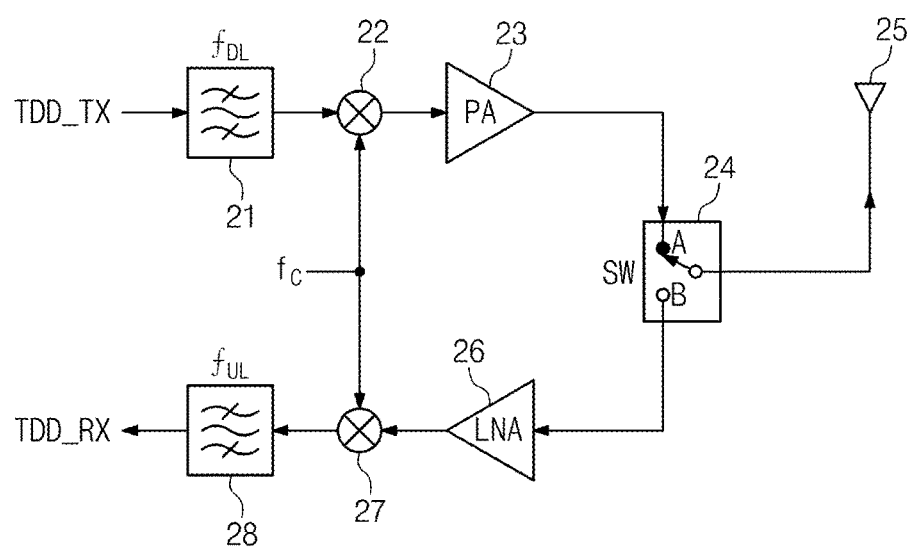

FIGS. 1A and 1B are block diagrams illustrating FDD and TDD transceivers, respectively. Referring to FIG. 1A, the FDD transceiver 10 includes mixers 11 and 16, a power amplifier 12, and a duplex 13, an antenna 14, and a low noise amplifier 15. Here, the FDD transceiver 10 is a transmission block of a base station and an uplink frequency and a downlink frequency are expressed conversely in a terminal.

During a downlink transmission operation, the mixer 11 modulates a baseband transmit signal FDD_TX provided from a baseband modem and a DAC (not shown) into a signal of a carrier frequency $F_{DL}$ band in a downlink channel. Then, the power amplifier 12 amplifies the poser of the signal provided from the mixer 11. The power amplifier 12 amplifies the signal modulated by the mixer 11 into a wireless emission available level. The duplex 13 separates the amplified signal into a downlink channel and an uplink channel. That is, only a signal of a carrier frequency $f_{DL}$ band in the downlink channel may be transmitted by an RF band filter 13a in the duplex 13.

During an uplink reception operation, by an RF band filter 13b in the duplex 13, a carrier frequency $f_{UL}$ band signal in the downlink channel is selected from a wireless signal received from the antenna 14. Then, the selected signal is amplified by the low noise amplifier 15 and then is converted into a baseband receive signal FDD_RX by the mixer 16. Then, the baseband receive signal FDD_RX is delivered to an ADC and a baseband modem (not shown) and processed.

In the FDD transceiver, a transmit signal and a receive signal are separated based on a difference between a carrier frequency $f_{UL}$ in an uplink channel and a carrier frequency $f_{DL}$ in a downlink channel.

Referring to FIG. 1B illustrating the TDD transceiver 20, during a downlink transmission operation, a baseband transmit signal TDD_TX is filtered by the baseband filter 21. Then, the filtered baseband transmit signal TDD_TX is modulated into a carrier frequency $F_C$ by the mixer 22. Then, the power amplifier 23 amplifies a transmit signal of the carrier frequency $f_C$ band. The transmit signal amplified by the power amplifier 23 may be transmitted to the antenna 25 when a node A is selected by a switch 24.

During an uplink reception operation, a wireless signal received by the TDD transceiver 20 enters the switch 24 through the antenna 25. The wireless signal is delivered to the low noise amplifier 26 in a time slot where a node B is selected by the switch 24. The received signal is amplified by the low noise amplifier 26 and is converted into a baseband signal by the mixer 27. The baseband signal is filtered by the baseband filter 28 again and is outputted as a baseband receive signal TDD_RX in an uplink channel. Then, the baseband receive signal TDD_RX may be delivered to an ADC and a baseband modem (not shown) and processed.

In the TDD transceiver, according to time slots allocated to an uplink or a downlink respectively, the switch 24 selects a channel. Accordingly, when the node of the switch 24 is positioned to A, a downlink channel is activated. On the other hand, when the node of the switch 24 is positioned to B, an uplink channel is activated.

Referring to FIGS. 1A and 1B, in order to configure a transceiver supporting both TDD and FDD, the size and cost of a transceiver are drastically increased.

Figure 2:
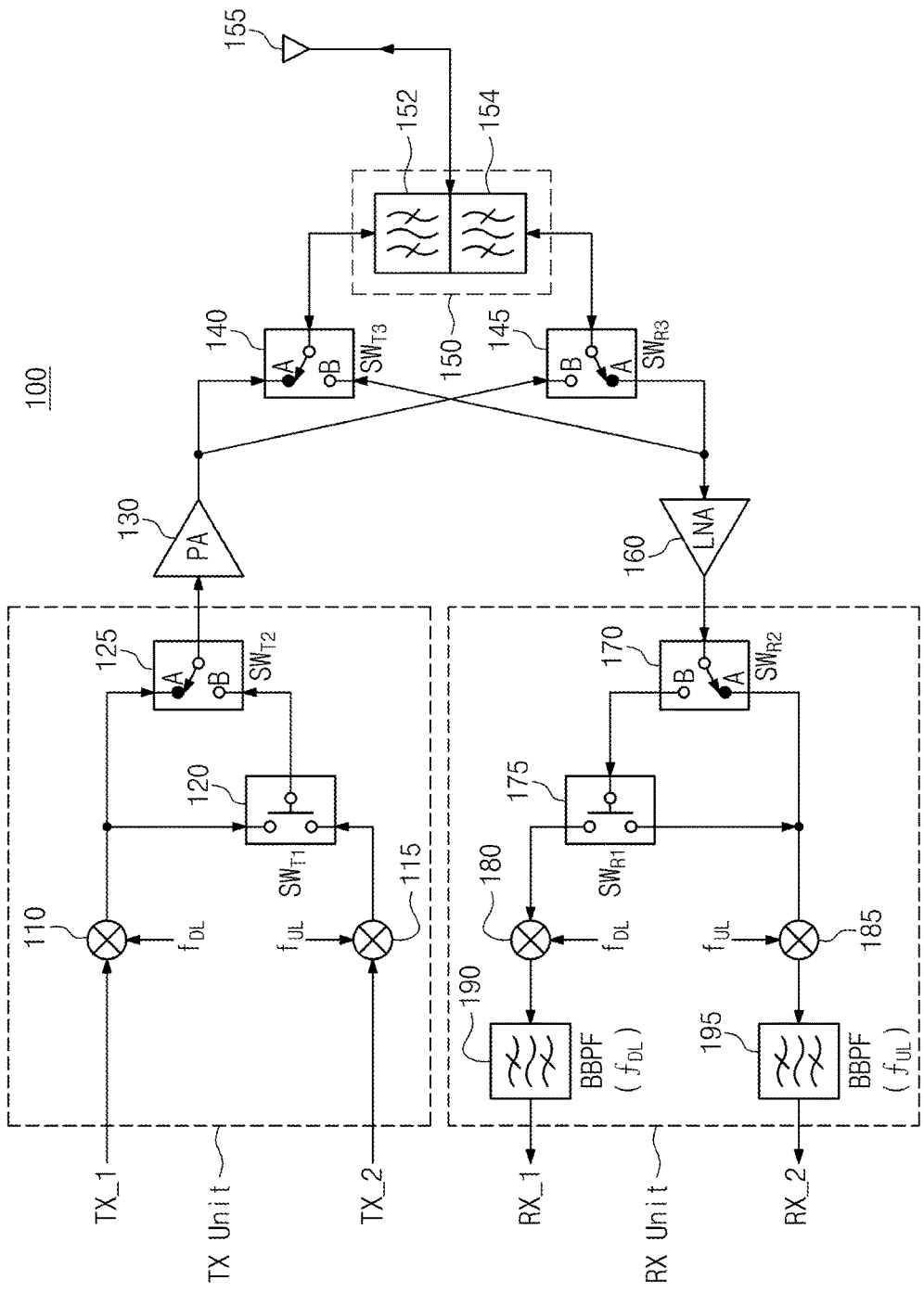
FIG. 2 is a block diagram illustrating a transceiver according to an embodiment of the present invention.

FIG. 2 is a block diagram illustrating a transceiver according to an embodiment of the present invention. Referring to FIG. 2, the transceiver 100 may support both an FDD mode and a TDD mode with one power amplifier 130 and one low noise amplifier 160. The transceiver 100 includes a transmit (TX) unit and a receive (RX) unit using both a downlink frequency band and an uplink frequency band in a TDD mode.

The Tx unit includes mixers 110 and 115 respectively modulating transmit signals of a downlink frequency $f_{DL}$ and an uplink frequency $_{UL}$, a mixing switches $SW_{T1}$ 120, a select switch $SW_{T2}$ 125, and a power amplifier 130. The RX unit includes a low noise amplifier 160, a select switch $SW_{R2}$ 170, a distribution switch $SW_{R1}$ 175, mixers 180 and 185, and baseband filters 190 and 195. Furthermore, the transceiver 100 includes a first switch $SW_{T3}$ 140, a second switch $SW_{R3}$ 145, a duplexer 150, and an antenna 155.

The TX unit may modulate baseband transmit signals TX_1 and TX_2 into a downlink frequency $f_{DL}$ and an uplink frequency $f_{UL}$, respectively, through the mixers 110 and 115.

The mixing switch 120 may be deactivated in an FDD mode. That is, in the FDD mode, the mixing switch 120 is open. Accordingly, in the FDD mode, the mixer 115 modulating the second transmit signal TX_2 into a signal of the uplink frequency $f_{UL}$ becomes deactivated. However, in the transmit time slot of the TDD mode, the mixing switch 120 mixes the baseband transmit signals TX_1 and TX_2 modulated into the downlink frequency $f_{DL}$ and uplink frequency $f_{UL}$ and delivers them into the select switch 125. Then, the select switch 125 delivers the transmit signal modulated into the two frequencies $f_{DL}$ and $f_{UL}$ to the power amplifier 130.

In the FDD mode, the first switch 140 and the second switch 145 may connect the TX unit, the RX unit, and the duplexer 150. The first switch 140 may deliver the first transmit signal TX_1 modulated to the downlink frequency $f_{DL}$ to the RF band filter 152 of the duplexer 150. The RF band filter 152 passes the first transmit signal TX_1 through the downlink frequency $f_{DL}$ band and then delivers it to the antenna 155. Then, the second switch 145 delivers a band signal of the uplink link frequency $f_{UL}$ received from the RF band filter 154 of the duplexer 150 to the RX unit.

Moreover, the TDD mode may be divided into a TDD transmission mode and a TDD reception mode. According to the TDD transmission mode and the TDD reception mode, the switches 120, 125, 140, 145, 170, and 175 may perform different selection operations. In the TDD transmission mode, the transmit signals TX_1 and TX_2 are respectively modulated into the downlink frequency $f_{DL}$ and uplink frequency $f_{UL}$ and are mixed by the mixing switch 120. Transmit signals mixed with two bands are amplified by the power amplifier 130 and separated in the duplexer 150 through the first and second switches 140 and 145.

In the TDD reception mode, receive signals received through the antenna 155 are separated by each band through the duplexer 150. Then, the receive signals separated by each band are provided to the low noise amplifier 160 through the first and second switches 140 and 145. The receive signals amplified by the low noise amplifier 160 are separated into the mixers 180 and 185 through the selection switch 170 and the distribution switch 185. The receive signals converted into a baseband by each of the mixers 180 and 185 are filtered through the baseband filters 190 and 195 and then outputted as baseband receive signals RX_1 and RX_2 in two bands.

Operations of each component in the transceiver 100 depending on each mode are described briefly above. According to a communication mode, a signal path may be changed by the mixing switch 120, the selection switch 125, the selection switch 180, the distribution switch 175, the first switch 140, and the second switch 145. By a selection operation of switches according to such a communication mode, a transceiver device supporting a multi mode may be implemented through one power amplifier 130 and one low noise amplifier 160. Detailed operations for each mode are described with reference to the tables and drawings FIG. 3 is a table illustrating states of switches for each mode in the transceiver of FIG. 2. Referring to FIG. 3, the transceiver 100 has different switch states according to an FDD mode and a TDD mode. Furthermore, the TDD mode is divided into a downlink mode TDD_DL and an uplink mode TDD_UL according to a time slot. The TDD downlink mode is referred to as a TDD transmission mode and the TDD uplink mode is referred to as a TDD reception mode. It is apparent that such definition is the definition of a base station and is conversely defined in a terminal.

First, in the FDD mode, the mixing switch 120 and the distribution switch 175 are maintained in an open state. Then, the selection switches 125 and 180 and the first and second switches 140 and 145 are controlled to select the node A. In such a state, the first transmit signal TX_1 in a baseband is converted into a signal of the downlink frequency $f_{DL}$ and is delivered to the antenna 155 through the duplex 150. Then, the second receive signal RX_2 of the uplink frequency $f_{UL}$ received from the antenna 155 is amplified by the low noise amplifier 160 and converted into a baseband signal by the mixer 185 and the baseband filter 195. In the FDD mode, the mixers 115 and 180, the switches 120 and 175, and the baseband filter 190 may be deactivated.

In the TDD transmission mode, the mixing switch 120 becomes shunt. That is, the mixing switch 120 mixes the first transmit signal TX_1 modulated to the downlink frequency $f_{DL}$ and the second transmit signal TX_2 modulated to the uplink frequency $f_{UL}$ and delivers the mixed signal to the node B of the selection switch 125. At this point, the selection switch 125 selects the node B so as to deliver the transmit signals TX_1 and TX_2 mixed by the mixing switch 120 to the power amplifier 130.

The first switch 140 selects the node A so as to deliver the transmit signals TX_1 and TX_2 provided from the power amplifier 130 to the RF band filter 152 of the duplexer 150. At this point, the first transmit signal TX_1 among the mixed transmit signals TX_1 and TX_2 modulated to an RF band by the RF band filter 152 is delivered to the antenna 155. Additionally, the second switch 145 selects the node B so as to deliver the transmit signals TX_1 and TX_2 provided from the power amplifier 130 to the RF band filter 154. At this point, the second transmit signal TX_2 among the mixed transmit signals TX_1 and TX_2 modulated to an RF band by the RF band filter 152 is delivered to the antenna 155.

Furthermore, in the TDD transmission mode, the distribution switch 175 in the RX unit may maintain an open state. Then, the selection switch 170 may cut off the delivery of a receive signal by selecting the node B.

In the TDD reception mode, the TX unit is deactivated and only the RX unit is activated. That is, the mixing switch 120 in the TX unit is controlled to be in an open state and the selection switch 125 is controlled to select the node B. However, the distribution switch 175 in the RX unit becomes shunt and the selection switch 170 is controlled to select the node B. Furthermore, the first switch 140 may be set to select the node B in order to form a reception path. Then, the second switch 145 is set to select the node A in order to form a reception path.

According to the each mode setting of a switch, a transceiver supporting an FDD mode, a TDD transmission mode, and a TDD reception mode by using one power amplifier 130 and one low noise amplifier 160 may be configured. Especially, in the TDD transmission mode and the RDD reception mode, the two bands of the uplink frequency $f_{UL}$ and the downlink frequency $f_{DL}$ are used so that frequency resources may be used efficiently.

Figure 4:
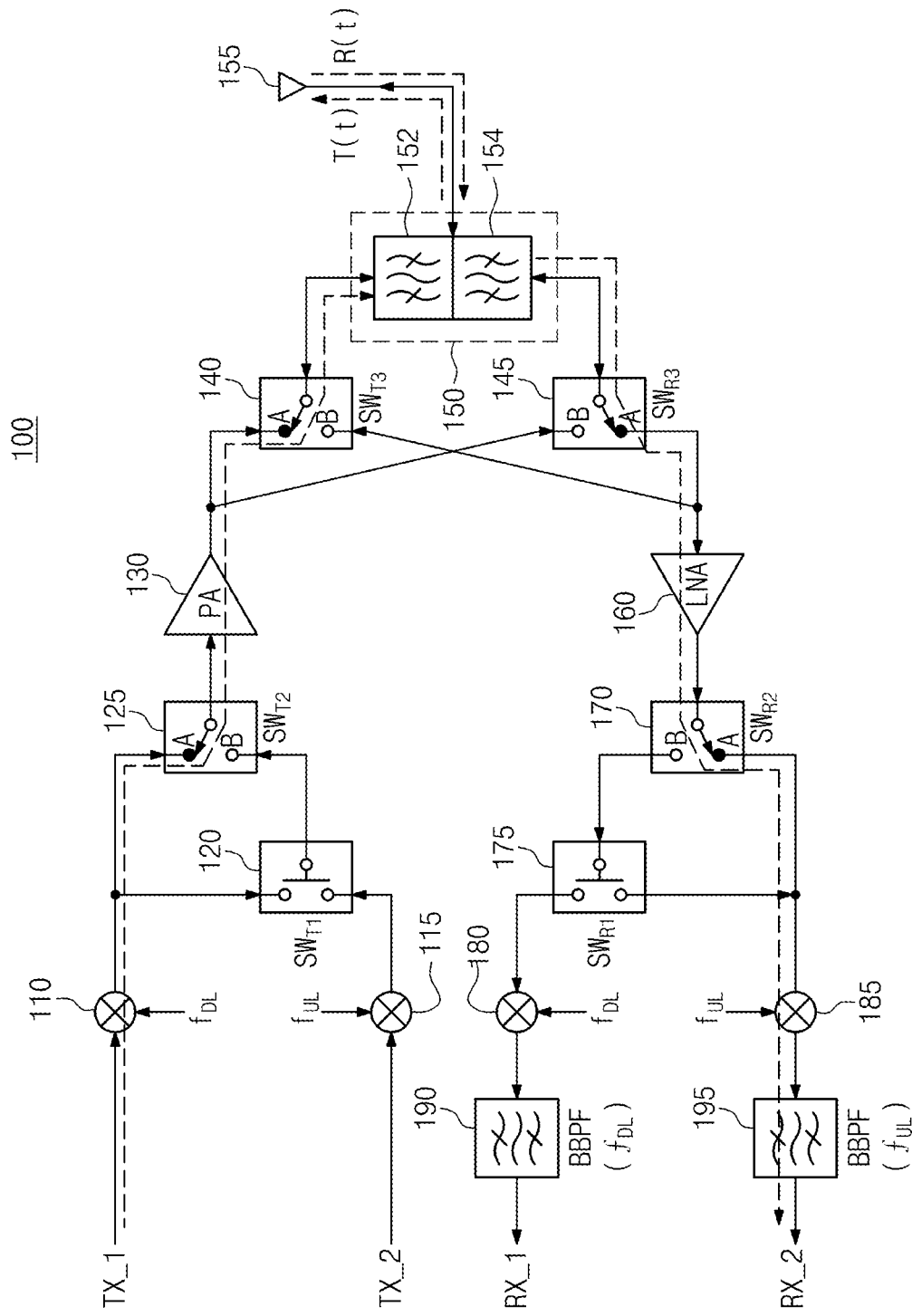
FIG. 4 is a block diagram illustrating a data path of the transceiver 100 according to an embodiment of the present invention.
Figure 5:
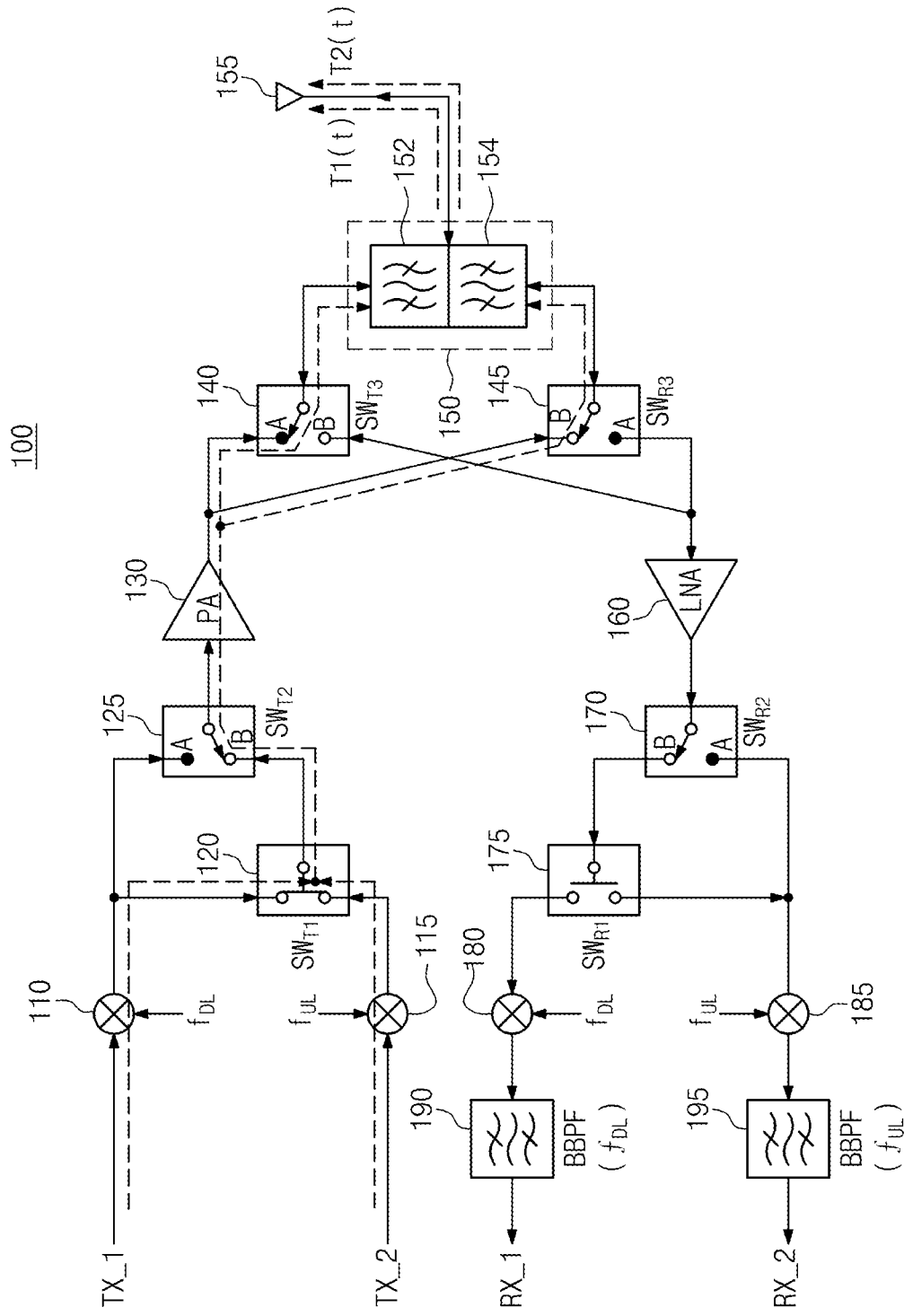
FIG. 5 is a block diagram illustrating a data path of the transceiver 100 in a TDD transmission mode according to an embodiment of the present invention.
Figure 6:
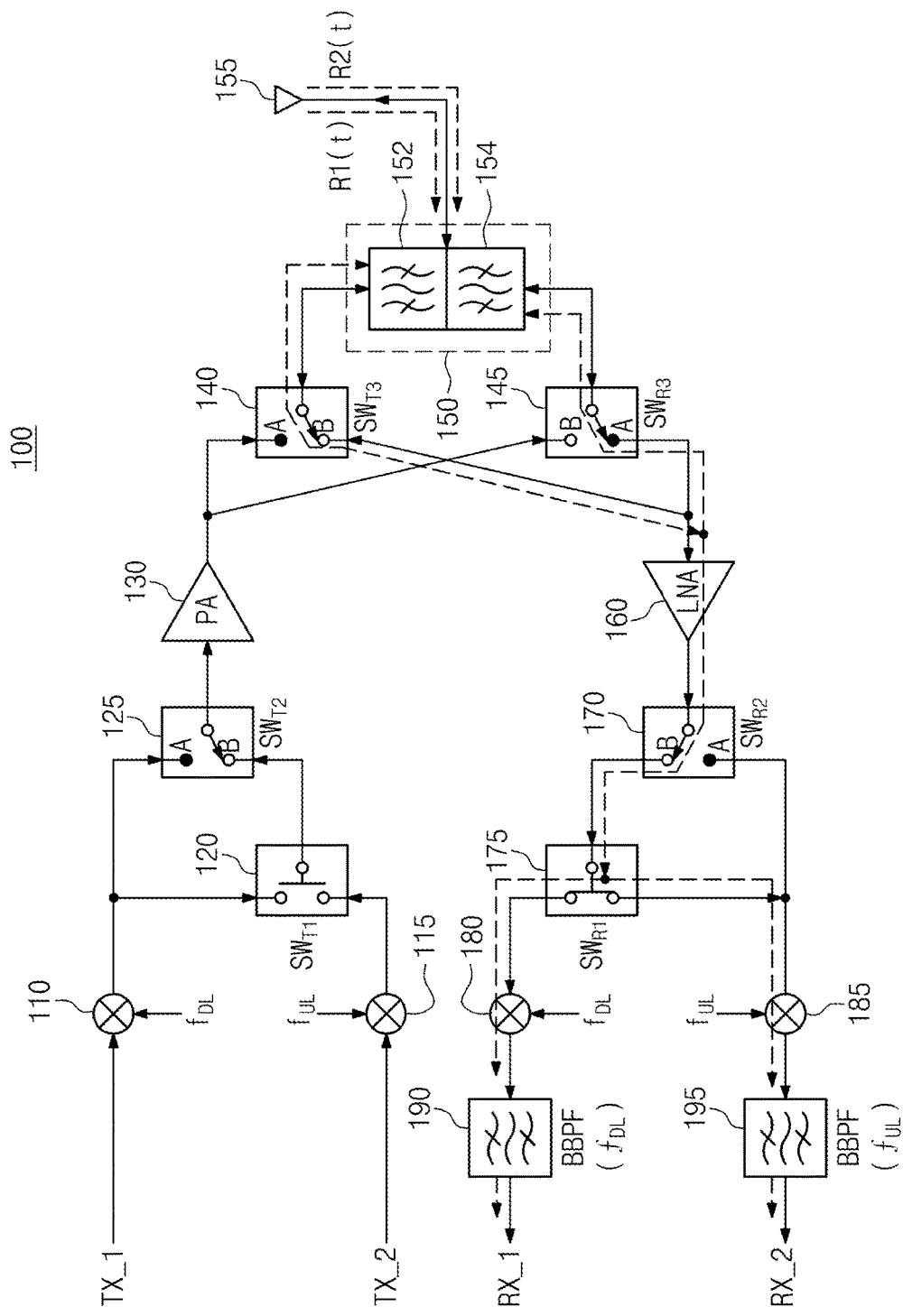
FIG. 6 is a block diagram illustrating a data path of the transceiver in a TDD reception mode according to an embodiment of the present invention.

FIGS. 4 to 6 are block diagrams illustrating a transmission or reception path for each mode according to a switch state of FIG. 3.

FIG. 4 is a block diagram illustrating a data path of the transceiver 100 according to an embodiment of the present invention. Referring to FIG. 4, an operation of the transceiver 100 in an FDD mode may be described briefly. In the FDD mode, the mixing switch 120 and the distribution switch 175 maintain an open state. Then, each of the selection switches 125 and 170 and the first and second switches 140 and 145 may be controlled to select the node A.

In such a state, a transmission operation is as follows. The first transmit signal TX_1 is modulated to the downlink frequency $f_{DL}$ and is delivered to the selection switch 125. Then, the first transmit signal TX_1 modulated to the downlink frequency $f_{DL}$ is amplified by the power amplifier 130 and is delivered to the duplex 150 through the first switch 140. The first transmit signal TX_1 modulated to the downlink frequency $f_{DL}$ is filtered to pass a wireless band by the RF band filter 152 of the duplex 150. The RF band filter 152 has a filter characteristic passing through a wireless band of the downlink frequency $f_{DL}$. The first transmit signal TX_1 modulated to the downlink frequency $f_{DL}$ processed by the duplex 150 is delivered as a transmit signal T(t) to the antenna 155.

A reception operation in the FDD mode is as follows. An uplink receive signal R(t) received through the antenna 155 is filtered by the RF band filter 154 of the duplexer 150. Then, the filtered receive signal R(t) is delivered to the low noise amplifier 160 by the second switch 145. The receive signal R(t) amplified by the low noise amplifier 160 is delivered to the mixer 185 by the selection switch 170. The mixer 185 demodulates the receive signal R(t) by using the uplink frequency $f_{UL}$. Then, the receive signal R(t) is demodulated to a baseband signal and delivered to the baseband filter 195. The receive signal in a baseband is outputted as the second receive signal RX_2 by the baseband filter 195. Then, although not shown in the drawings, the second receive signal RX_2 is processed by an ADC and delivered to a baseband modem.

According to the above-mentioned transceiver 100, the selection switch 125 and the first switch 140 in the FDD mode are configured to modulate the first transmit signal TX_1 into the downlink frequency $f_{DL}$ and to be selected by the duplexer 150 in order for the transmission of the first transmit signal TX_1 in a baseband. Then, the selection switch 170 and the second switch 145 are configured to select the uplink frequency $f_{UL}$ of the duplexer 150 and demodulate it into a baseband in order to receive the second receive signal RX_2.

FIG. 5 is a block diagram illustrating a data path of the transceiver 100 in a TDD transmission mode according to an embodiment of the present invention. Referring to FIG. 5, a signal delivery path of the transceiver 100 in the TDD transmission mode is shown. In the TD transmission mode, the TX unit of the transceiver 100 is activated and the RX unit is deactivated. The TDD transmission mode may be activated in a downlink time slot interval. Then, in the TDD transmission mode, data may be transmitted by both the downlink frequency $f_{DL}$ and the uplink frequency $f_{UL}$.

First, the transmit signals TX_1 and TX_2 in a baseband are provided to the mixers 110 and 115. The transmit signals TX_1 and TX_2 in a baseband are modulated into signals of an RF band, respectively, by the mixers 110 and 115. Then, the mixing switch 120 becomes shunt. The mixing switch 120 mixes the first transmit signal TX_1 modulated to the downlink frequency $f_{DL}$ and the second transmit signal TX_2 modulated to the uplink frequency $f_{UL}$ and then delivers it to the node B of the selection switch 125. At this point, the selection switch 125 delivers the transmit signals TX_1 and TX_2 in an RF band mixed by the mixing switch 120 to the power amplifier 130.

The transmit signals TX_1 and TX_2 in an RF band, which are amplified by the power amplifier 130, are transmitted to the antenna 155 through two transmission paths. That is, one transmission path is configured by the first switch 140 and the RF band filter 152. The amplified transmit signals TX_1 and TX_2 in an RF band, which are outputted from the power amplifier 130, are provided to the RF band filter 152 of the duplexer 150 through the first switch 140. The first transmit signal TX_1 modulated to the downlink frequency $f_{DL}$ by the RF band filter 152 is delivered as a transmit signal $T1(t)$ to the antenna 155. Another transmission path is configured by the second switch 145 and the RF band filter 154. The amplified transmit signals TX_1 and TX_2 in an RF band, which are outputted from the power amplifier 130, are provided to the RF band filter 154 of the duplexer 150 through the second switch 145. The second transmit signal TX_2 modulated to the uplink frequency $f_{UL}$ by the RF band filter 154 is delivered as a transmit signal $T2(t)$ to the antenna 155.

According to the above TDD transmission mode, the transceiver 100 may use both the downlink frequency $f_{DL}$ and the uplink frequency $f_{UL}$ during transmission. Accordingly, the utilization of a frequency resource may be maximized in a time slot for TDD transmission.

FIG. 6 is a block diagram illustrating a data path of the transceiver 100 in a TDD reception mode according to an embodiment of the present invention. Referring to FIG. 6, a signal delivery path of the transceiver 100 in the TDD reception mode is shown by a dotted line. In the TDD transmission mode, the TX unit of the transceiver 100 is deactivated and the RX unit is activated. The TDD transmission mode is activated in an uplink time slot interval of the TDD mode. Then, in the TDD transmission mode, data may be received by both the downlink frequency $f_{DL}$ and the uplink frequency $f_{UL}$.

First, the first receive signal $R1(t)$ and the second receive signal $R2(t)$ in an RF band may be provided from the antenna 155 to the duplexer 150. The RF band filter 152 of the duplexer 150 selects a receive signal in the downlink frequency $f_{DL}$ band and delivers the selected receive signal to the first switch 140. The RF band filter 154 of the duplexer 150 selects a receive signal in the uplink frequency $f_{UL}$ band and delivers the selected receive signal to the second switch 145. The receive signals separated by the duplexer 150 are delivered to the low noise amplifier 160 of the RX unit via the first and second switches 140 and 145.

The receive signals $R1(t)$ and $R2(t)$ in an RF band, which are amplified by the low noise amplifier 160, are distributed into the mixers 180 and 185 through the selection switch 170 and the distribution switch 175. Through the node B of the selection switch 170, the receive signals $R1(t)$ and $R2(t)$ are delivered to the distribution switch 175. Then, the receive signals $R1(t)$ and $R2(t)$ are delivered to the mixers 180 and 185 by the distribution switch 175.

The mixer 180 demodulates the receive signals $R1(t)$ and $R2(t)$ into a baseband by using the downlink frequency $f_{DL}$. Then, the center frequency of the receive signals $R1(t)$ and $R2(t)$ is converted into a baseband signal located in the baseband. Only the receive signal $R1(t)$ received at the downlink frequency fix, by the baseband filter 190 is selected from the receive signals $R1(t)$ and $R2(t)$ in the baseband. The receive signal RX_1 in the baseband, which is selected by the baseband filter 190, may be outputted.

The mixer 185 demodulates the receive signals $R1(t)$ and $R2(t)$ into a baseband by using the uplink frequency $f_{UL}$. Then, the center frequency of the receive signals $R1(t)$ and $R2(t)$ is converted into a baseband signal located in the baseband. Only the receive signal $R2(t)$ received at the uplink frequency $f_{UL}$ by the baseband filter 195 is selected from the receive signals $R1(t)$ and $R2(t)$ in the baseband. The receive signal RX_2 in the baseband, which is selected by the baseband filter 195, may be outputted.

According to the above TDD reception mode, the transceiver 100 may use both the downlink frequency $f_{DL}$ and the uplink frequency $f_{UL}$ during reception. Accordingly, the utilization of a frequency resource may be maximized in a time slot for TDD reception.

The above-mentioned transceivers of FIGS. 2 to 6 are described by using transceivers in a base station as examples. However, it is apparent that the transceiver of the present invention is identically applied to a terminal.

According to an embodiment of the present invention, in a device configured with inexpensive components, a transceiver supporting both an LTE-FDD mode and an LTE-TDD mode may be implemented.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. A transceiver comprising:
a transmission unit configured to modulate and to amplify at least one of a plurality of baseband transmit signals to an RF band;
a duplexer configured to transmit signals outputted from the transmission unit to an antenna by selecting a signal in a downlink frequency band or an uplink frequency band or filtering a receive signal received from the antenna by the downlink frequency band or the uplink frequency band;
a reception unit configured to demodulate the receive signals in the downlink frequency band or the uplink frequency band from the duplexer into at least one baseband signal;

a mixing switch configured to mix a plurality of RF band transmit signals according to a selected communication mode, wherein the selected communication mode comprises at least one of a first communication mode, a second communication mode, or a third communication mode;
a first switch configured to deliver a transmit signal provided from the transmission unit to a first RF band filter of the duplexer in the first communication mode and the second communication mode; and
a second switch configured to deliver a first receive signal delivered from a second RF band filter of the duplexer to the reception unit in the first communication mode and the third communication mode,
wherein each of the transmission unit and the reception unit comprises a power amplifier and a low noise amplifier.

2. The transceiver of claim 1, wherein in the second communication mode, the second switch is configured to deliver a transmit signal from the transmission unit to the second RF band filter of the duplexer.

3. The transceiver of claim 1, wherein in the third communication mode, the first switch is configured to deliver a second receive signal provided from the first RF band filter of the duplexer to the reception unit.

4. The transceiver of claim 1, wherein the transmission unit comprises a transmission switch terminal configured to select at least one of a plurality of RF band transmit signals according to the selected communication mode and to provide the selected at least one of the plurality of RF band transmit signals to the power amplifier.

5. The transceiver of claim 4, wherein the transmission switch terminal comprises:
a selection switch configured to select one of the plurality of RF band transmit signals or the mixed transmit signal according to the selected communication mode.

6. The transceiver of claim 5, wherein each of the plurality of RF band transmit signals comprises signals modulated to the uplink frequency band or the downlink frequency band.

7. The transceiver of claim 1, wherein the reception unit comprises:
the low noise amplifier configured to amplify RF band receive signals provided from the first switch or the second switch;
a reception switch terminal configured to select at least one of the RF band receive signals according to the selected communication mode; and
a plurality of baseband filters configured to demodulate the receive signals into a baseband.

8. The transceiver of claim 7, wherein the reception switch terminal comprises:
a selection switch configured to deliver the RF band receive signals to one of the plurality of baseband filters or to deliver the RF receive signals to the plurality of baseband filters simultaneously, according to the selected communication mode; and
a distribution switch configured to distribute receive signals in an RF band provided from the selection switch into the plurality of baseband filters simultaneously according to the selected communication mode.

9. The transceiver of claim 8, wherein the reception unit further comprises mixers demodulating the RF band receive signals into a baseband.

10. The transceiver of claim 1, wherein:
the first communication mode corresponds to a frequency division duplex (FDD) mode,
the second communication mode corresponds to a time division duplex (TDD) transmission mode, and
the third communication mode corresponds to a TDD reception mode.

11. A transceiver comprising:
a transmission switch terminal configured to select one or all of a first transmit signal of a downlink frequency and a second transmit signal of an uplink frequency;
a power amplifier configured to amplify a transmit signal delivered from the transmission switch terminal;
a duplexer configured to separate the amplified transmit signal into a downlink or uplink frequency band and to transmit the separated signal to an antenna or to filter a receive signal received from the antenna by the downlink or uplink frequency band;
a low noise amplifier configured to amplify receive signals in the downlink or uplink frequency band from the duplexer;
a reception switch terminal configured to distribute a receive signal outputted from the low noise amplifier into first and second demodulation units configured to demodulate signals into the downlink or uplink frequency band;
a mixing switch configured to mix the first transmit signal and the second transmit signal and to deliver the mixed signal to a selection switch in a time division transmission mode;
a first switch configured to deliver a transmit signal of the power amplifier to a first RF band filter of the duplexer in a frequency division mode and the time division transmission mode; and
a second switch configured to deliver a first receive signal delivered from a second RF band filter of the duplexer to the low noise amplifier in the frequency division mode and a time division reception mode.

12. The transceiver of claim 11, wherein the second switch is configured to deliver a transmit signal from the power amplifier to a second RF band filter of the duplexer in the time division transmission mode.

13. The transceiver of claim 11, wherein the first switch is configured to deliver a second receive signal provided from the first RF band filter of the duplexer to the low noise amplifier in the time division reception mode.

14. The transceiver of claim 11, wherein:
the selection switch is configured to deliver the first transmit signal to the power amplifier in the frequency division mode and to deliver a signal delivered from the mixing switch to the power amplifier in the time division transmission mode.

15. The transceiver of claim 11, wherein the reception switch terminal comprises:
a selection switch configured to deliver an output of a low noise amplifier to the first demodulation unit configured to demodulate signals into the uplink frequency band in the frequency division mode; and a distribution switch configured to distribute the output of the low noise amplifier into the first demodulation unit and the second demodulation unit configured to demodulate signals by the uplink and downlink frequency bands, respectively in the time division reception mode.

* * * * *